United States Patent
Yamashita

[11] 3,970,402
[45] July 20, 1976

[54] WEDGE-CLAMPED FLANGE JOINT

[76] Inventor: Mikio Yamashita, 1337 Sakonyama, Asahi, Yokohama, Japan

[22] Filed: Feb. 14, 1975

[21] Appl. No.: 549,927

[30] Foreign Application Priority Data
Aug. 7, 1974  Japan.............................. 49-90580

[52] U.S. Cl................................ 403/338; 403/374; 52/758 C; 52/758 D; 52/584; 285/367
[51] Int. Cl.².................... F16D 1/00; F16L 23/00
[58] Field of Search .......... 52/758 D, 758 C, 758 F, 52/754, 493, 584; 403/409, 374, 188, 338; 285/367

[56] References Cited
UNITED STATES PATENTS

| | | | |
|---|---|---|---|
| 2,102,247 | 12/1937 | Whelan............................. | 52/493 X |
| 2,655,239 | 10/1953 | Kenlock............................ | 52/584 X |
| 3,264,020 | 8/1966 | De Ridder........................ | 52/758 D |
| 3,854,269 | 12/1974 | Hancock...................... | 52/758 D X |

Primary Examiner—Thomas F. Callaghan
Assistant Examiner—Wayne L. Shedd
Attorney, Agent, or Firm—Oblon, Fisher, Spivak, McClelland & Maier

[57] ABSTRACT

An elongated jointing device in the shape of beam body has a substantially H-shape in cross section, the lateral bar portion connecting the pair of parallel vertical portions of the H configuration serving as a distributed fulcrum. A pair of flanged members are positioned with the contact surfaces of their flanges being mated. One of the grooves of the jointing device is fitted onto the mated flanges and pinches them. By inserting at least one wedge into the other groove of the device, the one groove is narrowed thereby pinching the mated flanges and an intimate joint is formed between the two members.

4 Claims, 21 Drawing Figures

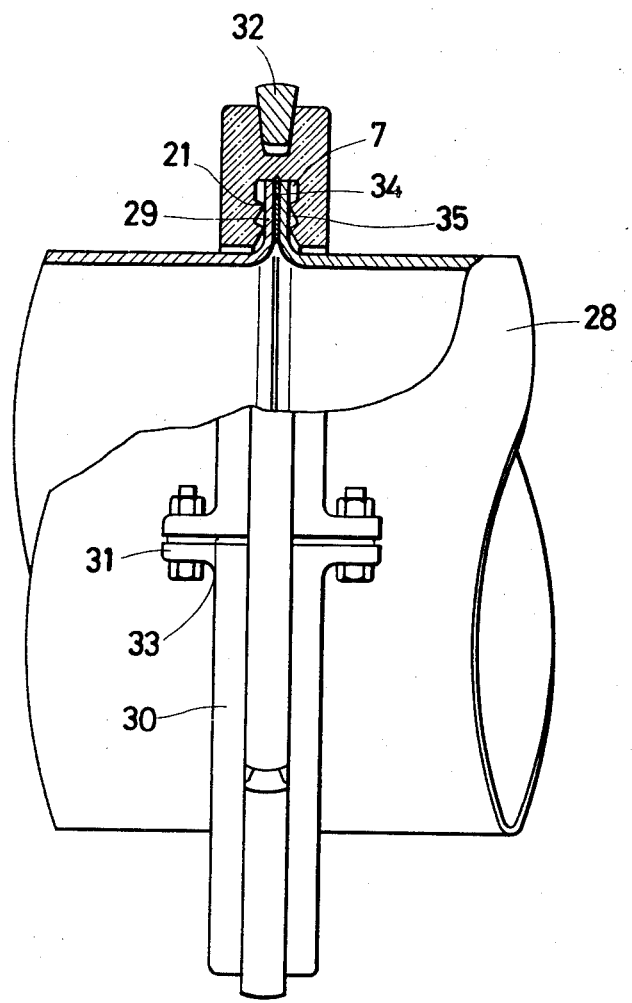

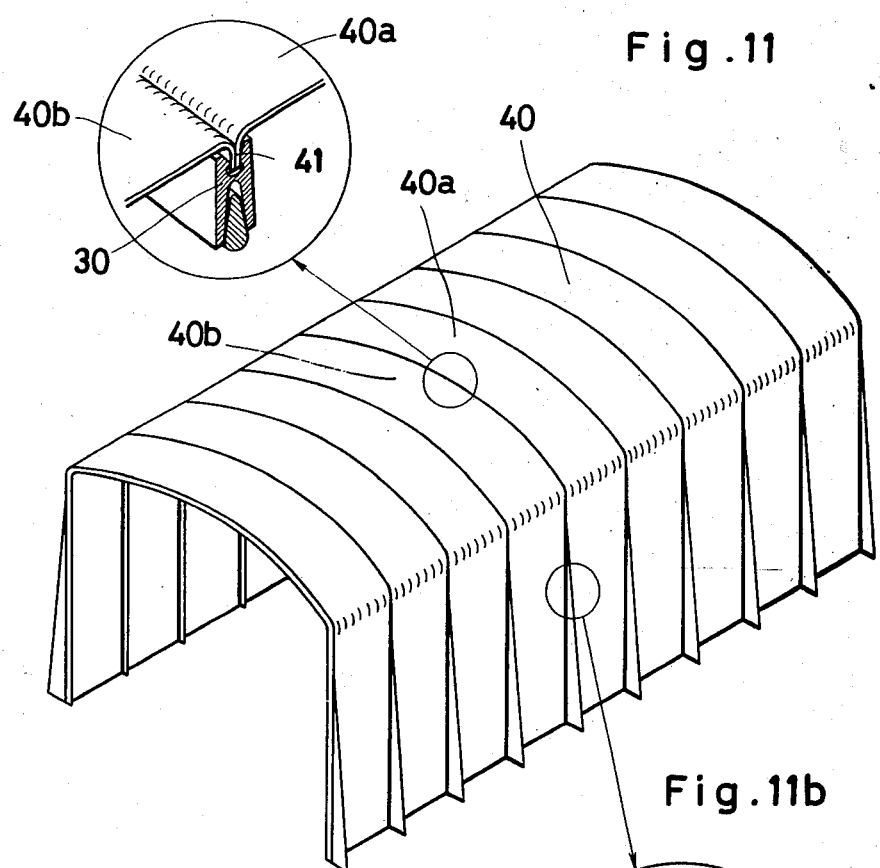
Fig. 11a
Fig. 11
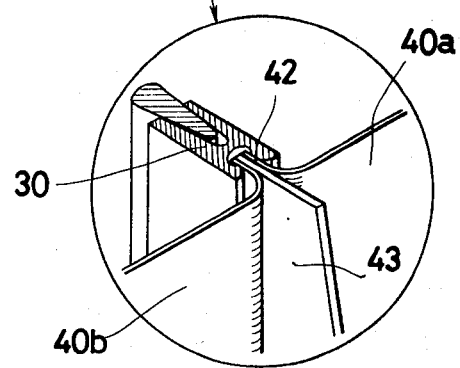
Fig. 11b

WEDGE-CLAMPED FLANGE JOINT

BACKGROUND OF THE INVENTION

Conventional methods of jointing adjacent members include riveting, welding, bolt-nut jointing, etc...

In the riveting and bolt-nut jointing methods which utilize compressive force applied to mated flanges in directions toward each other, bolts or rivets are placed in a state of tension in their axial direction, the tension being equal to the compressive force, because the riveting or the tightening of the bolts is performed after the flanges have been brought into intimate contact with each other. Further, the compressive force acting on the rivet or bolt portions of the mated flanges does not act equally on portions of the flanges other than the portions having rivets or bolts. To overcome this problem, it is usual to make the thickness of the flange large enough to provide sufficient rigidity thereto. In a case where a fluid pressure acts on the mating surfaces of the flanges, however, leakage of the fluid from the mated surfaces occurs because the unbalance in pressure distribution on the surfaces cannot completely be avoided even by increasing the thickness of the flanges or attempts to uniformly distribute the tightening pressure on the mated flanges. This is because the flange portions may be resiliently deformed between the riveted or bolted areas by external forces.

SUMMARY OF THE INVENTION

A primary object of the present inventions is to overcome the disadvantages of the conventional jointing methods.

Another object of the present invention is to provide a novel jointing method for flanged members by pressing the mated flanges of the members against each other by utilizing moments of force provided by lever action.

Another object of the present invention is to provide a novel jointing technique by which a uniform compressive force is applied throughout the mating surfaces of the flanges to be jointed.

A further object of the present invention is to provide a novel jointing technique by which it is possible to realize a dual fluid seal of the jointed portion. A further object of the present invention is to provide a jointing device which is effective to achieve the above objects as well as to reinforce the resultant articles.

The present invention by which the above objects can be achieved resides in utilization of at least one beam body and at least one wedge. The beam body is composed of a pair of parallel members and a fulcrum member which connects the parallel members with each other and concurrently serves as a distributed fulcrum. The beam body is generally H-shape in cross section and is of desired length. Therefore, the present beam body can be considered as an elongated body formed with an upper groove and a lower groove throughout, the partition between the grooves being the fulcrum member.

Contact surfaces of flanges of members to be jointed are mated and a first groove of the beam body is fitted over the mated flanges. A wedge is inserted into the other or second groove to thereby widen the width thereof and hence provide a pinching action on the first groove so that the mated flanges are intimately contacted with each other by side walls of the first groove.

The material forming the beam body and the material forming the members to be jointed need not necessarily be metal but may be any material having sufficient resiliency and rigidity to satisfy the various requirements to be described later.

As mentioned above, according to the present invention, the members to be jointed have flanges and the contact surfaces of the flanges are mated firstly as in the conventional jointing method. The mated flanges are disposed within the first groove of the present beam body and, by inserting a wedge into the second groove, a compressive stress is applied to the mated flanges by the side walls of the first groove through the fulcrum action of the partition member of the beam body. In this case, the compressive force utilized for jointing the flanges corresponds to the moment of force about the fulcrum point due to the fulcrum wedge effect provided by the wedge inserted into the second groove of the beam body and the fulcrum point may be in the fulcrum member connecting the parallel members.

The composite force resulting from the sum of the wedging force and the reaction force of the compressive force acting on the mated flanges is balanced by a tension stress in the fulcrum member or in the partition member of the beam body in which the fulcrum is included. That is, under this balanced condition, a tension stress equal to the composite force is induced within the fulcrum member.

According to the present invention, compressive force acting on the flange portions through the side walls of the groove in which the mated flanges are inserted is uniform throughout the mating surfaces of the flanges because the side walls cover the full length of the mated flanges. Thus the contact pressure exerted on the flange portions is uniform throughout, which is not the case in the conventional riveting or bolt-nut method having the disadvantages previously mentioned.

Further, according to the present invention, since the mating surfaces of the flanges are compressively contacted with each other by the effect of moments produced by positioning the mated flanges between the side walls of a first groove of the beam body and providing thereon a lever action, a uniform pressure is produced between the outer side faces of the mated flanges and the side walls of the groove of the beam body, in addition to the above mentioned uniform pressure on the mating surfaces of the flanges. Therefore, a dual fluid seal is established, the first seal being between the mating flange surfaces and the second being between the outer face of the flanges and the side walls of the beam body groove. This feature of the present invention is another important advantage when the vessel jointed according to the present invention is used to transport or to store fluid.

According to the present invention, the thickness of the flanges of the members to be jointed may be small. As mentioned previously, the thickness of the flanges must be large enough to provide a satisfactory rigidity thereto in the conventional method, otherwise fluid leakage will occur. Since in the present method, the beam body reinforces the flange portions themselves, leakage will not occur even if the thickness of the flanges is very small. This is a very important effect of the present invention, particularly when it is used to joint very thin walled, large-diameter tubes or very thin walled cell structures.

A conventional continuous welding method requires skilled labor, much time, expensive product management, etc. These disadvantages become increasingly severe when, as has been the recent tendency, the size of the vessels used grows larger.

According to the present invention, these problems are completely and easily overcome. That is, since the work required to construct vessels using the method of the present invention is to simply insert the wedge or wedges into the beam body or bodies, there is no need for skilled labor or long fabrication periods and the operation is thus very economical.

As described heretofore, it will be clearly understood that the present invention comprises the steps of mating end portions of plate like members or mating flanges formed by bending the end portions of the plate like members, inserting the mated portions into a first groove of a beam body which has a second groove at the opposite position to the first groove, and inserting at least one wedge into the second groove to compress the mated portions by the lever action provided by the wedge through a partition portion between the grooves to thereby accomplish a tight joint, and that the present invention is superior to the conventional jointing techniques in that the jointing force is produced by the lever action of the beam body itself, that the jointing faces receive uniform pressures, in that a dual fluid seal is established, in that the jointed portion is remarkably reinforced by the beam body and in that the fabrication work is very simple and economical.

As mentioned above, according to the present invention the beam body comprises a pair of parallel members which act as levers and a fulcrum member which connects the parallel members and acts as a distributed fulcrum, the cross section of the beam body being in an H-shape including a first groove and an opposite second groove. By inserting a wedge into one of the grooves, the width thereof is spread through the resilient deformation of the fulcrum member. Therefore, the width of the other groove is narrowed correspondingly, so that the portions positioned in the other groove are compressed with uniform compressive force, resulting in an intimate joint between the portions with a constant contacting surface pressure.

When the wedge is removed from the groove in any suitable manner such as, for example, by using a lever, the members are easily freed from the jointing relation. The insertion or removal of the wedge with respect to the groove can be made very easy by properly selecting the design of the lever, its length and the angle of the wedge.

There are various possible structural configurations of the jointing portions of the members to be jointed and of the beam body and the wedge. For example, when flat members are to be jointed, the beam body and hence the wedge will be elongated and straight and when curved or cylindrical members are to be jointed, the beam body or bodies and hence the wedge or wedges will be curved. Specifically, the present invention can advantageously be applied to jointing thin walled, large-diameter tubes, prefabricated building components, cell structures, etc. . .

The aforementioned and other objects and features of the present invention will become clear from the following descriptions of preferred embodiments of the present invention with reference to the attached drawings.

BRIEF DESCRIPTION OF THE DRAWINGS

FIG. 2 shows cross sections of an H-shape beam in accordance with this invention and the wedge therefor;

FIG. 6 is a front view, partially in cross section, of circular pipes joined by the method of the present invention;

FIG. 11 shows an application of the method of the present invention to joining of a cell structure wherein FIG. 11a and FIG. 11b show perspective views of typical applications of the present beam; and FIG. 12 shows the present invention in jointing edge portions of prefabricated structural components jointed at the edge portions by the method of the present invention wherein

Figure 1:
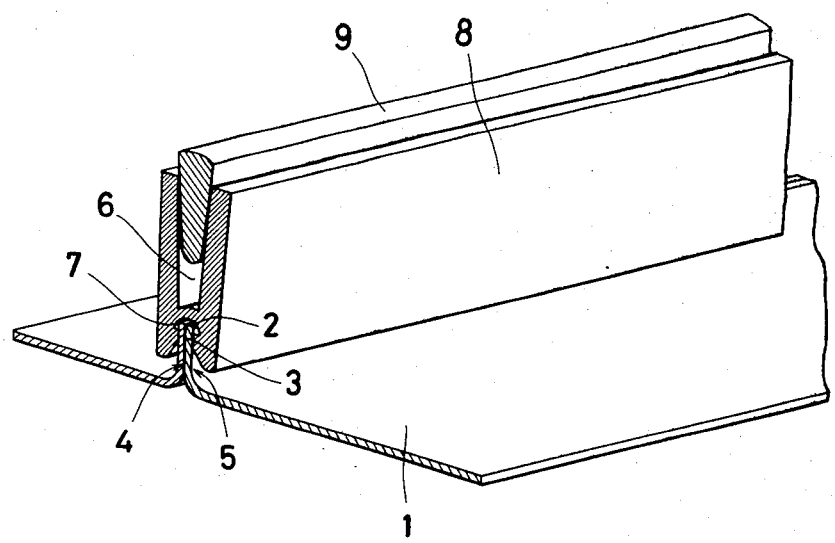
FIG. 1 is a perspective view of an embodiment of the present jointing device having an H-shape cross section, showing the use thereof in jointing a pair of plates by wedging.

DESCRIPTION OF PREFERRED EMBODIMENTS:

Returning to FIG. 1, edge portions 3 of plate like members 1 are bent at right angles to provide flanges having ends 2. Outer jointing faces 4 of the flanges 3 may be machined to provide flat smooth planar surfaces. The flat faces 4 are mated as shown. Inner faces 5 of the flanges 3 provide guide surfaces for a beam body when the faces are mated, as described subsequently.

A beam body 8 according to the present invention is formed with a first groove 7 and a second groove 6 each extending along the length of the beam 8 to make the cross section of the beam H-shaped. The first groove 7 is fitted on the mated flanges and then a wedge 9 is inserted into the second groove 6 to widen the width of the second groove 6 and hence reduce the width of the first groove 7 to thereby compress the jointing portion.

Figure 2A:
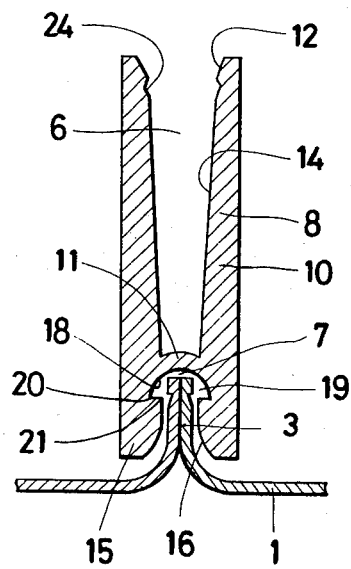
FIG. 2a shows cross sections of the beam and the wedge when the beam is fitted on the mated portions of the members to be jointed.

The beam body 8 shown in FIG. 2 has a relatively shallow first groove 7 and a deep second groove 6. The inner walls 14 of the second groove 6 are tapered inwardly toward the bottom of the groove, to facilitate the insertion of the wedge 9. Upper end portions 12 of the inner walls of the second groove 6 are rounded to provide initial guidance for the wedge 9.

An end wall portion 11 of the second groove 6 constitutes a connecting members connecting side member 10 of the beam body so that it can act as a distributed fulcrum for the members 10. Inner walls 16 of the first groove 7 are also tapered inwardly toward the bottom to facilitate the fitting thereof onto the guide surfaces 5 of the flanges 3.

A pair of opposing portions 19 are defined by the opposite end portions of the end wall 18 and shoulders 20 provided around on the inner walls 16 of the first groove 7. The edges 21 of the shoulders 20 are made sharp so that, when the wedge 9 is inserted into the second groove 6 and hence the width of the first groove 7 is reduced to compress the flanges 3, the sharp edges 21 act to compress the walls 5 of the flanges 3 to thereby put the faces 4 in forced intimate contact with each other.

When the portions 15 of the side members 10 are forced against each other by the effect of the wedge 9 and the surfaces 5 of the flanges 3 pinched between the portions 15 are compressed with a strong resiliency, uniform contact pressures are produced between the faces 5 of the flanges 3 and the sharp edges 21 and between the faces 4 of the flanges 3, so that the two members 1 are joined. In order to provide airtight contact between the sharp edges 21 and the faces 5 of the flanges 3, it may be, desirable to shallow notches 22 on the faces 5 so as to provide interlocking contact.

Figure 2B:
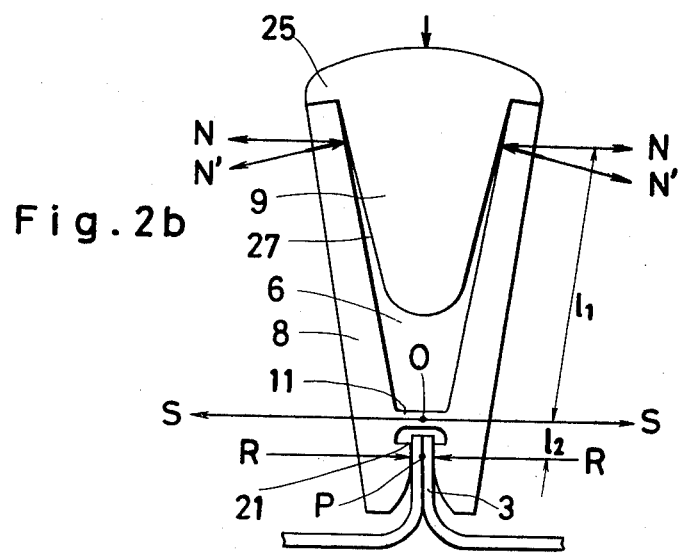
FIG. 2b shows a cross section of the beam fitted on the mated jointing portions with the wedge inserted.

As shown in FIG. 2b, by inserting the wedge 9 into the second groove 6 a pair of opposing wedging forces N' are produced which act on the upper ends of the beam body 8 to widen the width of the second groove 6 outwardly. The wedging forces N' in turn induce reaction forces E acting against the wedge, resulting in a balance of forces as shown.

Since this balance of forces is established after the edges 21 of the beam body 8 are in contact with the flanges 3, a compressive force R is exerted on the flanges 3 due to the fulcrum effect of the wedging force N'. In this case, the moment about the fulcrum point O in the wall portion 11 is balanced and this state can be expressed as follows:

$$R = l_1/l_2 \, N$$

And a composite force S produced by the reaction forces R and N is exerted on the wall portion 11 as a tension force. Since some resilient reaction force due to the resilient deformation of the beam body 8 is included in the forces N and R, the compressive forces R due to the fulcrum effect acts resiliently on the flanges 3 of the members 1 to be joined. This is one of the very important features of the present invention.

As mentioned previously, if a balance condition is established, the composite force S due to the fulcrum effect acts on the fulcrum point O in the the wall portion 11 of the beam body 8 as a tension force. It may be considered that the force S is a tension force acting as a moment about the center fulcrum point P of the compressive force R acting on the flanges 3 of the members 1. For this reason, if the cross sectional configuration of the wall portion 11 is selected as an arched shape having a center coinciding with the fulcrum point P, the stress distributed in the wall portion 11 becomes a tension and therefore there is no compressive stress in the wall portion 11. It is advisable to select the cross sectional configuration of the wall portion 11 as an arched one rather than a flat plate-like one in view of strength. If a flat plate-like wall is employed as the wall portion 11, the wall portion 11 will be bent downwardly by the moment about the point P and thus the stress around the center nodal line of the wall portion 11 can be increased.

Although it is advantageous that the distribution of the tension stress in the wall 11 be uniform, the stress should be within the limitation of elasticity because if the design should be such that the stress exceeds the limitation of elasticity, there will result creeping and an accompanying reduction in the compressive force R.

In order to prevent loosening from occurring, a pair of edge-like dents 24 may be provided at the upper portion of the wall surfaces 14 of the beam body 8 throughout the length thereof. The dents 24 serve to prevent the wedge 9 from escaping from the second groove 6. (FIG. 2a) The length of the wedge 9 to be inserted into the second groove 6 of the beam body 8 is usually made substantially equal to the length of the beam body 8 so that the wedge can be inserted into the second groove throughout the length thereof. However, it is also possible to divide the wedge 9 into sections of suitable lengths and to insert these sections along the groove at suitable intervals. In this case, the intervals between the wedges should be equally selected.

The angle of the active surface 27 of the wedge 9 should be less than the friction angle. If the active surface angle is equal to or larger than the friction angle, there is a possibility of the wedge escaping from the groove.

Further, in this embodiment, a pair of shoulders 25 are provided at the rear end of the wedge 9. The shoulders 25 serve as stoppers for limiting the amount of insertion of the wedge 9 into the groove 6. Because of the presence of the shoulders 25, the insertion depth of the wedge 9 with respect to the beam body 8 is maintained uniform throughout the length thereof after the wedge is forced into the groove 6 until the shoulders 25 contact with the outer edges of the groove 6, and thus the jointing pressure on the flanges 3 is maintained uniform. In this case, it should be noted that the gap between the shoulders 25 and the outer ends of the groove 6 may be used as a measure of the force exerted by the wedge 9 inserted thereinto and hence as a measure of joint strength.

Figure 3A:
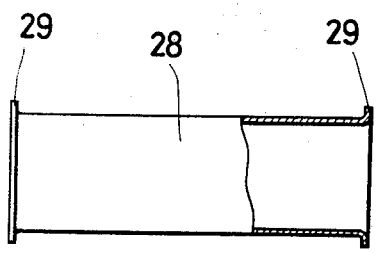
FIG. 3 shows a front view, partially in cross section, and a side view of a circular pipe connectable by the method of present invention.
Figure 3B:
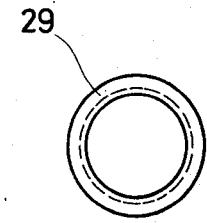

It is easy to modify the configuration of the flanges 3 of the plate members 1 to bent ones or to annular ones as now described. In the latter case, the plate member may be a thin-walled cylindrical tube as indicated by 28 in FIGS. 3 to 5.

Figure 4A:
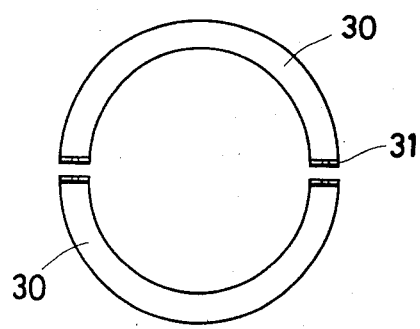
FIG. 4 shows front and side views of an embodiment of present beam device having a configuration suitable for use in jointing a circular pipe as shown in FIG. 3.
Figure 4B:
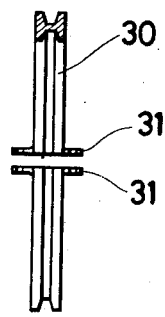

The cylindrical tube 28 has annular flanges 29 at both ends thereof. In FIG. 4, are shown a pair of semicircular beam bodies 30 suitable for use with the annular flanges 29. These semicircular beam bodies are H-shape in cross section similarly to those in the previous embodiment. Each of the semicircular beam bodies 30 is provided with flanges 31 at the ends thereof. When the first grooves 7 of the beam bodies 30 are put on the mated flanges 29, the flanges 31 of the beam bodies 30 are mated and then suitably jointed as by bolt-nut connection to form a complete annular beam body.

Figure 5A:
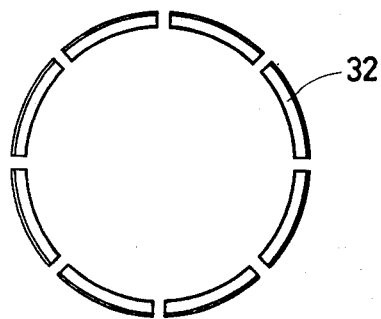
FIG. 5 shows in cross section and in plane arrangement an example of a wedge suitable for use with the beam shown in FIG. 4.
Figure 5B:
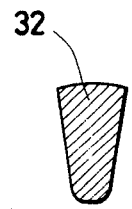

FIG. 5 shows wedge segments to be inserted into the second grooves 6 of the annular beam body 30. Although the number of the wedge segments 32 is eight in FIG. 5, any number is possible. The number of the beam segments 30 may also be more than the two shown in FIG. 4.

FIG. 6 shows another embodiment of the present beam body which is similar to that shown in FIG. 4 except that packing materials 33 and 34 are disposed between the flanges 31 and between the flanges 29, respectively, to provide a water-tight construction and that shoulders 21 are formed on the side surfaces 16 of the first groove 7 of the beam body 30 to provide an airtight seal between the second groove 7 and the outside by resilient pressure contact between the side faces 35 of the flanges 29 and the shoulders 21. According to the last mentioned embodiment, an airtight and pressure resistant joint is provided.

Figure 7:
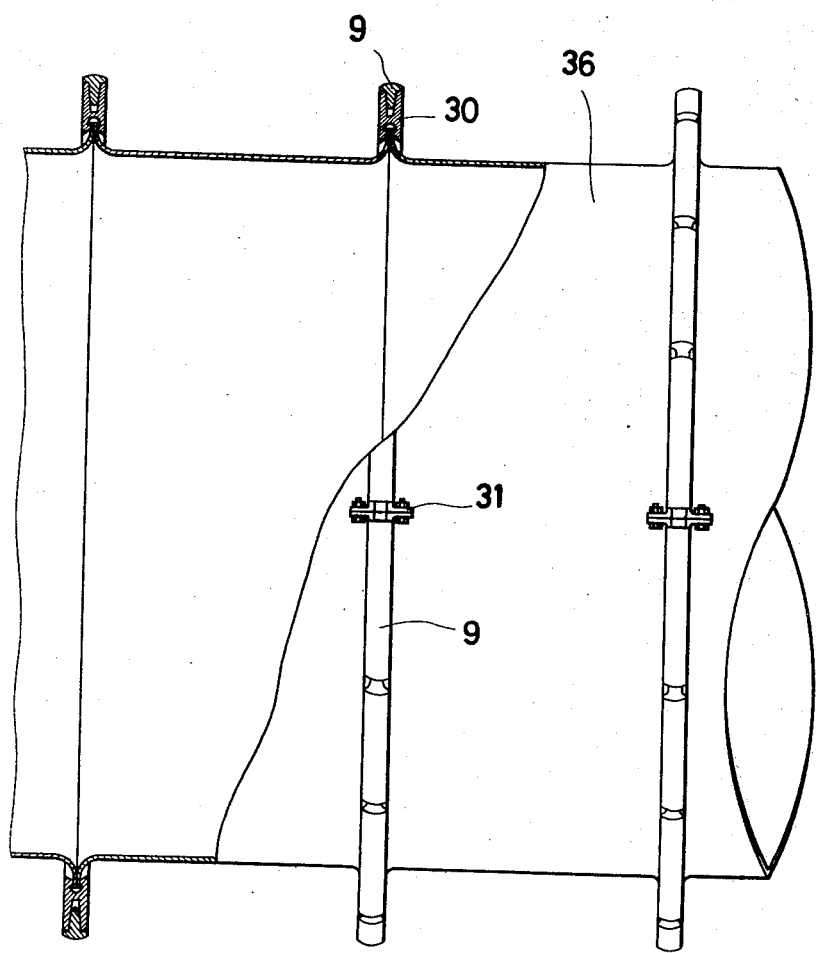
FIG. 7 is a front view, partially in cross section, of another example of circular pipes joined by the method of this invention.

FIG. 7 shows the present invention applied to jointing a plurality of thin-walled, large-diameter tubes 36 of relatively short length. As is well known, the length of such thin-walled, large-diameter tubes is limiited to a certain relatively short value due to the limitations on the machining ability of press machines and/or roll machines. Therefore, the number of joints is necessarily increased. The present jointing method is particularly useful in such cases. As is well known, the tubes have low mechanical strength and are susceptible to deformation. According to the present jointing, method, the annular beam body 30 provides auxiliary reinforcement to the tube. In addition, the shorter the tube is, the stronger it becomes, because of the increase in the number of reinforcing joints.

Figure 8:
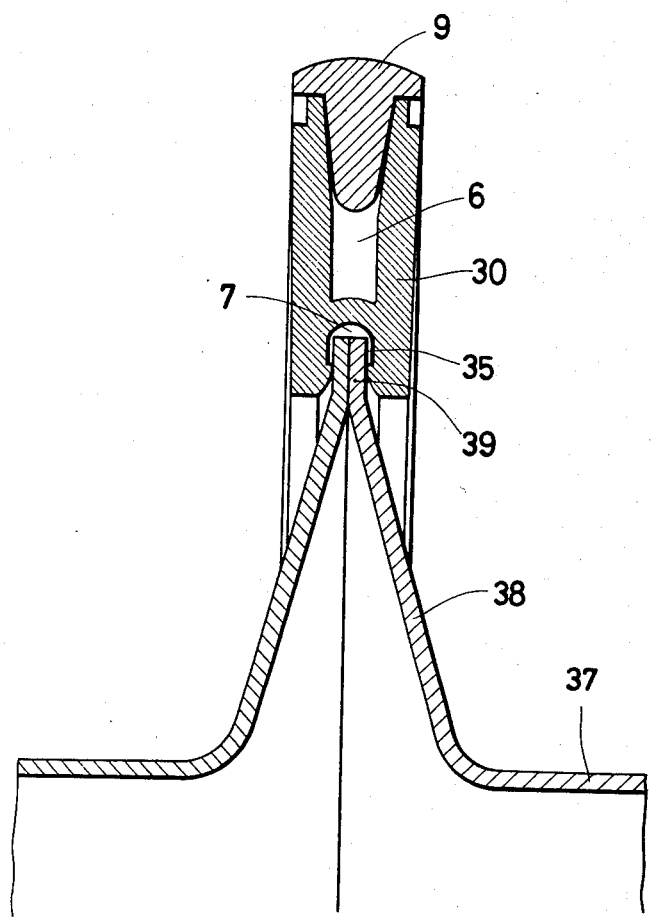
FIGS. 8, 9 and 10 show various jointing states obtainable by the method of the present invention when applied to jointing thin-walled, large-diameter pipes having various flange configurations.
Figure 9:
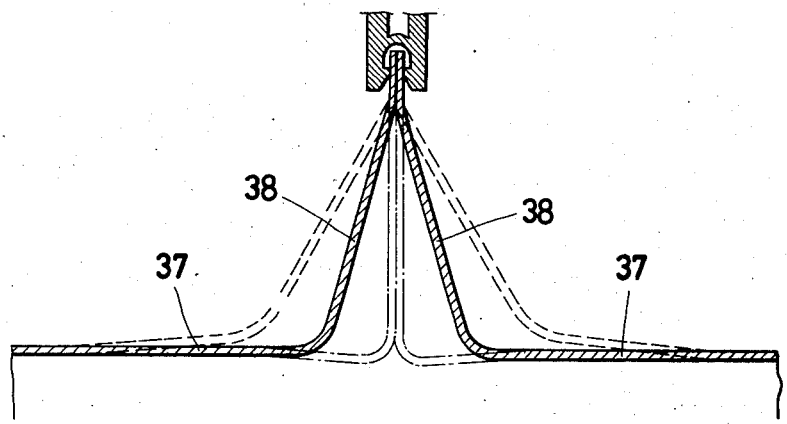
Figure 10:
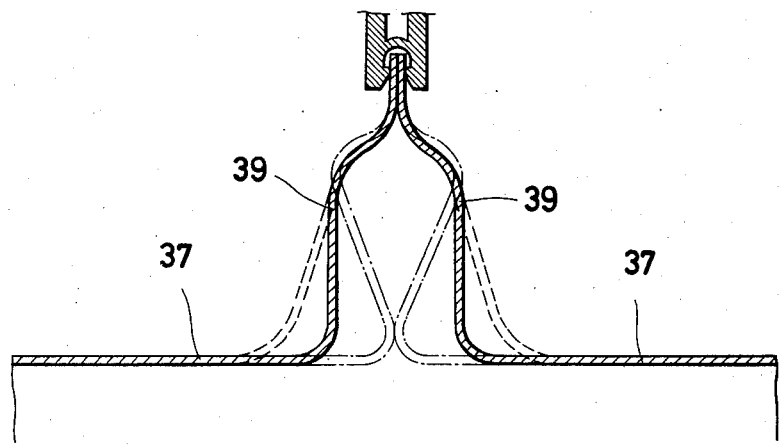

FIGS. 8 to 10 show the present invention when applied to jointing relatively flexible thin-walled, large-diameter tubes. In FIGS. 8 and 9, end portions 38 of a tube 37 are plastically bevelled and the end areas of the bevels are flattened to provide annular flanges 39 with which flanges of other tubes having the same structure are mated.

The first grooves 7 of the present beam bodies 30 are put over the outer faces 35 of the mated flanges 39 and, after the beam bodies 30 are bolted to form an annular beam body, the wedges 9 are inserted into the first grooves 6 of the beam bodies 30 in the same manner as shown in FIG. 6.

By jointing a plurality of such relatively short tubes as shown in FIG. 8 or 9 by the present invention, a long tube, having a bellows shape, can be constructed.

In this case, externally applied forces in the axial directions or other stresses in other directions are absorbed in the sloped faces of the bevel portions 38 by the bent portions thereof. That is, as shown in FIG. 9, when a compressive force or forces are applied thereto in the axial direction, the bevel portions 38 will bent as shown by chain lines and when a stretching force in the axial direction is applied thereto, the portions 38 will be deformed as shown by broken lines. Therefore, a series of tubes connected in this bellows-like manner can resiliently absorb axial shocks, thermal stresses and/or other unexpected external forces and thus provide protection against damage and sufficient flexibility for installation of the tube along a curved path. Further, in this case, the mechanial strength of the tube in the radial direction will be increased by the annular beam body as well as by the bevelled flange portions 38.

FIG. 10 is similar to FIG. 9 except that the flange portion is not bevelled but dish-shaped as shown by 39. The axial force applied to the joint tube can be absorbed by the deformation of the dish-like flange portions 39. That is, when a compressive force is applied in the axial direction, the portions 39 will be deformed until the roots of the portions 39 contact with each other as shown by chain lines.

Since each of the above tubes is mechanically weak, it is usual to joint some of the tubes at a suitable place beforehand and transport the jointed tubes to the place of installation. The installation of the tubes may be performed in accordance with a suitable method such as the Spread method on land or the Laybarge method on sea. In such case, the tubes jointed by the present invention have the advantage of remarkably reduced bending stress when suspended under their own weight because of short intervals between the joints which reinforce the tube itself.

FIG. 11 shows another use of the present invention wherein a plurality of generally inverted U-shape cell structures 40 are jointed to form a barrack.

Each of the cell structures 40 has inwardly protruding flanges 41 at both sides of the roof portion and flanges 42 at both sides of the side portions thereof. The flanges 41 of adjacent cells 40a and 40b are directly mated and the flanges 42 of the adjacent cells are indirectly mated through a support panel 43 which supports the barrack. The present beam bodies 30 are attached as shown and the wedges 9 are inserted in the same manner as mentioned previously.

Figure 12:
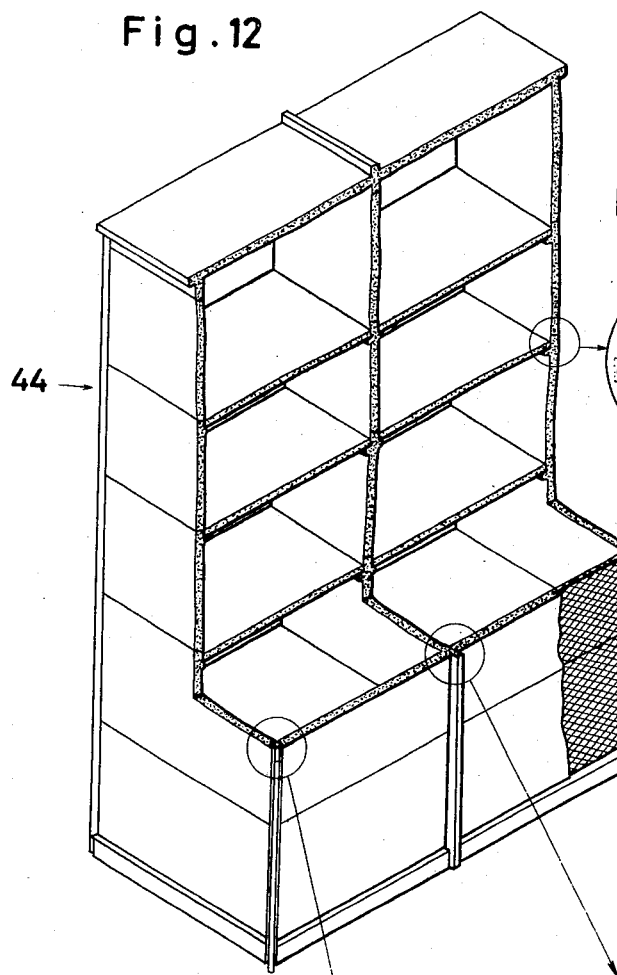
Figure 12A:
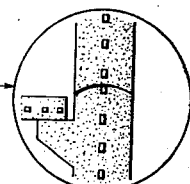
FIGS. 12a, 12b and 12c show various jointed portions thereof.
Figure 12B:
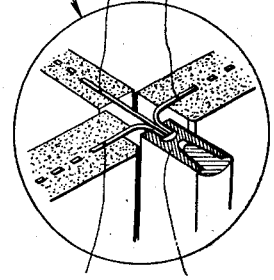
Figure 12C:
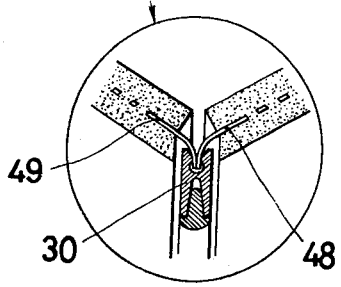

FIG. 12 illustrates another application of the present invention to a building 44 composed of prefabricated components each of which may be a wall structure of expanded steel mesh and concrete. Each of the components includes end steel plates 45, 46, 47 buried in the edges and jointed with the expanded steel mesh thereof and these plates are suitably bent, the bending depending upon the places in which the edge is to be disposed. FIGS. 12b and 12c show examples of different bendings of the plates wherein FIG. 12b shows an orthogonal three wall arrangement and FIG. 12c shows a corner arrangement of two walls. As seen in FIG. 12b, the bendings of the flanges 45 and 46 of the walls to be jointed in the same plane are right angled and the flange 47 of the wall to be jointed in a plane perpendicular to the other two walls is not bent but is pinched by the right angled flanges 45 and 46. For the corner joint, the end plates 48 and 49 are bent at 45° angles as shown in FIG. 12c. The application of the present invention to these flanges is the same as described previously. By using the present invention for this purpose, the fabrication or defabrication of the structure made from the prefabricated wall components can be easily accomplished even by unskilled persons with a minimum of time consumption.

As will be obvious to those skilled in the art, by the use of the present invention in constructing buildings such as shown in FIGS. 11 and 12 there can be obtained earthquake-proof buildings having sufficient flexibility to absorb bending moments, shearing stress and/or thermal stress acting on the building.

In summary, the present invention was made in response to the recent requirement for thin-walled, large-diameter tubes which has resulted from the recent development of the capsulated transportation pipe-line through which large sized solid articles are transported. As those in this field know from experience, the conventional welding or bolt-nut method of jointing the unit tube segments is inconvenient. Particularly in the bolt-nut method it is difficult even for skilled persons to obtain uniform tightening of the joints and as a result it is difficult to completely eliminate leakages from the flange portions. Further, the conventional methods of jointing require time consuming work and special skill. According to the present method, the above disadvantages inherent in the conventional methods are completely overcome. In addition, the use of the present invention remarkably shortens the time required for installation while simultaneously improving the reliabilily of the pipe-line because the joints according to the present invention are of uniform quality. Since the flanges of the tubes connected by the method of the present invention may be thin a saving in material may be realized. The forgoing advantages of the present invention make the use of the present invention more economical than the use of any of the conventional methods.

I claim:

1. A device for jointing flanged members comprising in combination:

an H-shaped elongated beam body comprising a pair of parallel members and a transversely extending fulcrum member integrally connecting said parallel members together, a first pair of substantially parallel legs of said H-shaped member, defining a first space for housing said flanged members, extending in a first direction away from said fulcrum member and upon one side thereof, and a second pair of substantially parallel legs of said H-shaped member, defining a second space for housing wedge means, extending in a second direction away from said fulcrum member and upon the opposite side thereof relative to said first pair of legs so as to be aligned with said first pair of legs, said second pair of legs being substantially longer than said first pair of legs so as to provide a lever action with respect to said first pair of legs, about said fulcrum when said wedge means is inserted within said second space, and said first and second spaces also being parallel to and encompassing the medial plane of symmetry of said H-shaped member, and wedge means, having a length corresponding to that of said H-shaped elongated beam and adapted to be inserted into said second space, for pivoting and expanding both legs of said second pair of legs outwardly and away from each other about said fulcrum member and for simultaneously pivoting and converging both legs of said first pair of legs toward each other about said fulcrum member, whereby both legs of said first pair of legs positively grip and joint said flanged members.

2. The device for jointing flanged members according to claim 1, wherein:

the sides of said beam members are formed in circular shape.

3. The device for jointing flanged members according to claim 1 wherein:

said device has indents for preventing said wedge means from escaping from said second pair of legs.

4. The device for jointing flanged members according to claim 1, wherein:

said wedge means has shoulders projecting from both sides thereof and at the head portion thereof for limiting the depth to which the wedge means is inserted within said second space.

* * * * *